United States Patent
Ku et al.

(10) Patent No.: US 7,903,775 B2
(45) Date of Patent: Mar. 8, 2011

(54) METHOD AND APPARATUS FOR CONTROLLING TRANSMISSION FREQUENCY IN SERIAL ADVANCED TECHNOLOGY ATTACHMENT

(75) Inventors: Young-Min Ku, Suwon-si (KR); Ho-Joong Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 963 days.

(21) Appl. No.: 11/711,737

(22) Filed: Feb. 28, 2007

(65) Prior Publication Data

US 2007/0237216 A1    Oct. 11, 2007

(30) Foreign Application Priority Data

Apr. 10, 2006    (KR) ........................ 10-2006-0032172

(51) Int. Cl.
  *H04L 7/00* (2006.01)
(52) U.S. Cl. .......... 375/356; 375/220; 375/357; 375/358
(58) Field of Classification Search .......... 375/219–221, 375/354, 356–358, 337; 370/241, 249; 708/127, 708/189
See application file for complete search history.

(56) References Cited

U.S. PATENT DOCUMENTS

| | | | |
|---|---|---|---|
| 2003/0081707 A1 | 5/2003 | Takeuchi et al. | |
| 2004/0101078 A1 | 5/2004 | Hirata et al. | |
| 2004/0157576 A1 | 8/2004 | Adachi et al. | |
| 2006/0056564 A1 | 3/2006 | Takeuchi | |
| 2007/0153129 A1* | 7/2007 | Kawamoto et al. | 348/705 |

FOREIGN PATENT DOCUMENTS

| | | |
|---|---|---|
| JP | 09-198343 | 7/1997 |
| JP | 2000-040054 | 2/2000 |
| JP | 2004-280558 | 10/2004 |
| KR | 100212084 B1 | 5/1999 |
| KR | 1020050096030 A | 10/2005 |
| WO | 9709786 A1 | 3/1997 |

OTHER PUBLICATIONS

Aoyama et al., "3Gbps, 5000ppm Spread Spectrum SerDes PHY with Frequency Tracking Phase Interpolator for Serial ATA," 2003 Symposium on VLSI Circuits, Digest of Technical Papers, Kyoto, Japan, Jun. 12-14, 2003; Symposium on VLSI Circuits, New York, NY: IEEE, US, Jun. 12, 2003, pp. 107-110.

* cited by examiner

*Primary Examiner* — David C Payne
*Assistant Examiner* — James M Perez
(74) *Attorney, Agent, or Firm* — Volentine & Whitt, PLLC

(57) ABSTRACT

A method, a related system, and recordable media adapted to store the method. The method controlling transmission frequency for first and second transmission signals exchanged between a host and an attached device using a serial advanced technology attachment (SATA) technology by detecting a first transmission frequency from a received first transmission signal, and controlling a second transmission frequency for a second transmission signal in relation to the detected first transmission frequency.

6 Claims, 5 Drawing Sheets

METHOD AND APPARATUS FOR CONTROLLING TRANSMISSION FREQUENCY IN SERIAL ADVANCED TECHNOLOGY ATTACHMENT

BACKGROUND OF THE INVENTION

1. Field of the Invention

The present invention relates to a method and apparatus for controlling the transmission frequency in a serial advanced technology attachment (SATA). More particularly, the invention is related to a method and a related semiconductor apparatus for minimizing communication errors potentially occurring when a standard transmission frequency changes due to temperature variations and/or jitter by appropriately controlling the transmission frequency used between a host device and SATA device.

This application claims the priority of Korean Patent Application No. 10-2006-0032172, filed on Apr. 10, 2006, the subject matter of which is hereby incorporated by reference.

2. Description of the Related Art

SATA is a next-generation data transmission method providing about twice the operating speed of conventional parallel advanced technology attachment (PATA). SATA technology is characterized in one aspect by the use of a simple external connection cable that facilitates electrical connection and mechanical assembly. A first generation SATA (1.0) specification is complete. It is also expected that second generation SATA and third generation SATA related to entry-level servers will soon be completed.

The interface structure associated with SATA includes a data cable, a power cable, and a connector. FIG. 1 illustrates a conventional SATA interface 10. Referring to FIG. 1, interface 10 includes twin data cables 100, five power cables 110, host connectors 120 and 130, and associated device connectors 140 and 150.

While PATA uses a power supply voltage swing of five volts (5.0 V), SATA uses a power supply voltage swing of only one-half a volt (0.5 V). Accordingly, during data transmission, electromagnetic effects and related data signal interference is reduced and power consumption is markedly decreased. However, when the power supply voltage swing is thus reduced, the possibility of signal distortion due to external interference increases. To overcome this potential problem, SATA uses a differential data transmission scheme.

The twin data cables are used in SATA to accomplish differential data transmission. Each data cable essentially forms a separate data path. In each data path, data is transmitted in only one direction. For example, data is always transmitted from a SATA compliant host controller to an attached device comprising a SATA compliant controller using one of the two data paths, while data is always transmitted from the attached device to the host controller using the other data path. Accordingly, timing skew potentially caused by a time difference between these separate data transmissions does not occur and data may be transmitted at relatively higher frequencies. For example, first generation SATA provides for an operating frequency of 1.5 GHz (i.e., a data transmission rate of 150 Mega bits per second).

Generally, the data communications enabled by a SATA interface occur at a specified standard transmission frequency. Both the host and the attached device generate the specified transmission frequency using respective crystal oscillators.

The crystal oscillators required to generate the standard transmission frequency are very sensitive to temperature. When the temperature of the host or attached device changes during operation, the standard transmission frequency defined by the output of the crystal oscillator may also change. Any change in the standard transmission frequency may cause a data communication error.

Generally, the host and attached device have a receiver frequency offset range adapted to unilaterally compensate for some moderate drift in the standard transmission frequency. Within this receiver frequency offset range, a change in the standard transmission frequency will not result in a data communication error. However, this capability presupposes a stable standard transmission frequency within each device and this may not be the case. For example, if a changed transmission frequency transmitted from the host and received by the attached device is within the receiver frequency offset range, a returning standard transmission frequency is typically transmitted back to the host by the attached device without a data communication error. However, since the standard transmission frequency may have changed again (or further) in the host during the first transmission period, the returning transmission may be interrupted as containing errors.

FIG. 2 is a flowchart of a communications method adapted for use with a conventional SATA interface. In operation S210, a transmission frequency is detected from a signal received from a host or an attached device. In operation S220, it is determined whether the detected transmission frequency is within a receiver frequency offset range. If the detected transmission frequency is not within the receiver frequency offset range, a communication error is determined in operation S240. Accordingly, an associated controller performs one or more transactions corresponding to the detected communication error. However, if the detected transmission frequency is within the receiver frequency offset range, data is transmitted between the host and the attached device at a specified standard transmission frequency in operation S230.

FIG. 3 is a conceptual diagram illustrating the generation of a communication error occurring during a conventional exchange of data. In the illustrated example of FIG. 3, the standard transmission frequency generated by a crystal oscillator in a host using second generation SATA technology is assumed to change in response to temperature variations.

For example, it is assumed that a standard transmission frequency of the host migrates to 1.6 GHz due to a change in the ambient operating temperature from a specified standard transmission frequency of 1.5 GHz. As a result, a receiver frequency offset range within the host is defined between 1.55 through 1.65 GHz. Hence, the host transmits data to the attached device at the changed transmission frequency of 1.6 GHz. The attached device receives the transmitted data, detects a transmission frequency of 1.6 GHz, and determines whether the detected transmission frequency is within the receiver's frequency offset range of 1.45 GHz to 1.65 GHz. Since the detected transmission frequency of 1.6 GHz is within the receiver frequency offset range of the attached device, it then normally return transmits data to the host at the standard transmission frequency of 1.5 GHz.

However, the receiver frequency offset range of the host has been defined in a range of between 1.55 GHz to 1.65 GHz in due to a change in the ambient operating temperature, or some other factor. Accordingly, when the return data signal from the attached device is received at the host at the correct (e.g., as specified) standard transmission frequency of 1.5 GHz, the previously established host receiver frequency offset range of 1.55 GHz to 1.65 GHz results in the generation of a communication error.

Thus, it is clear that an improved method of data communications is required that reduces communication errors occurring due to changes in a standard transmission frequency.

SUMMARY OF THE INVENTION

Embodiments of the invention provide a method and a related semiconductor apparatus adapted to reduce communication errors related to undesired changes in a standard transmission frequency due to temperature, jitter, etc. Such embodiments appropriately control the standard transmission frequency used for data communication and are particularly well suited to applications implementing serial advanced technology attachment (SATA) technology.

In one embodiment, the invention provides a method of controlling transmission frequency for first and second transmission signals exchanged between a host and an attached device using a serial advanced technology attachment (SATA) technology, the method comprising; detecting a first transmission frequency from a received first transmission signal, and controlling a second transmission frequency for a second transmission signal in relation to the detected first transmission frequency.

In another embodiment, the invention provides a recording medium adapted to record a program executing a method of controlling transmission frequency for first and second transmission signals exchanged between a host and an attached device using a serial advanced technology attachment (SATA) technology, the method comprising; detecting a first transmission frequency from a received first transmission signal, and controlling a second transmission frequency for a second transmission signal in relation to the detected first transmission frequency.

In another embodiment, the invention provides a serial advanced technology attachment (SATA) compliant device adapted for attachment to a SATA compliant host, the attached device comprising; a transmission frequency detection circuit adapted to detect a first transmission frequency from a first transmission signal received from the host, a SATA compliant controller adapted to output a control signal controlling a second transmission frequency of a second transmission signal in accordance with the detected first transmission frequency, and a frequency oscillator adapted to generate the second transmission frequency of the second transmission signal in response to the control signal.

DESCRIPTION OF EMBODIMENTS

Figure 1:
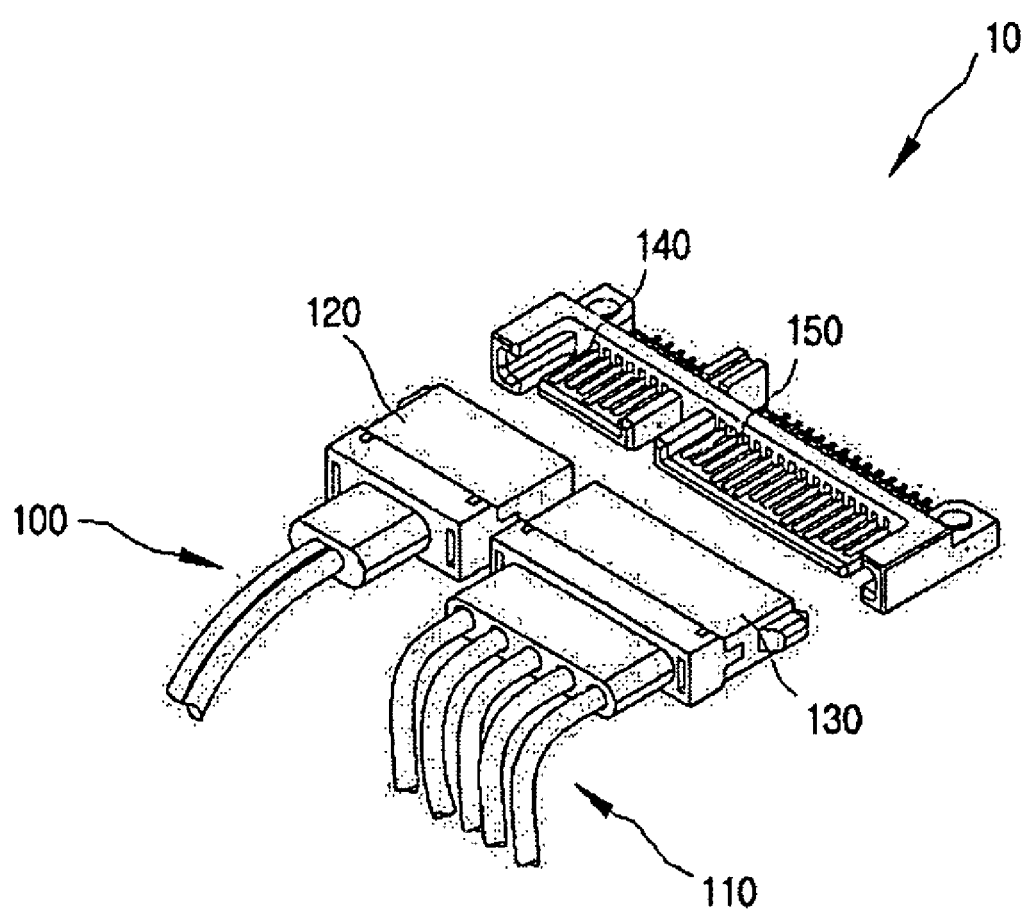
FIG. 1 illustrates a conventional serial advanced technology attachment (SATA) interface structure.
Figure 2:
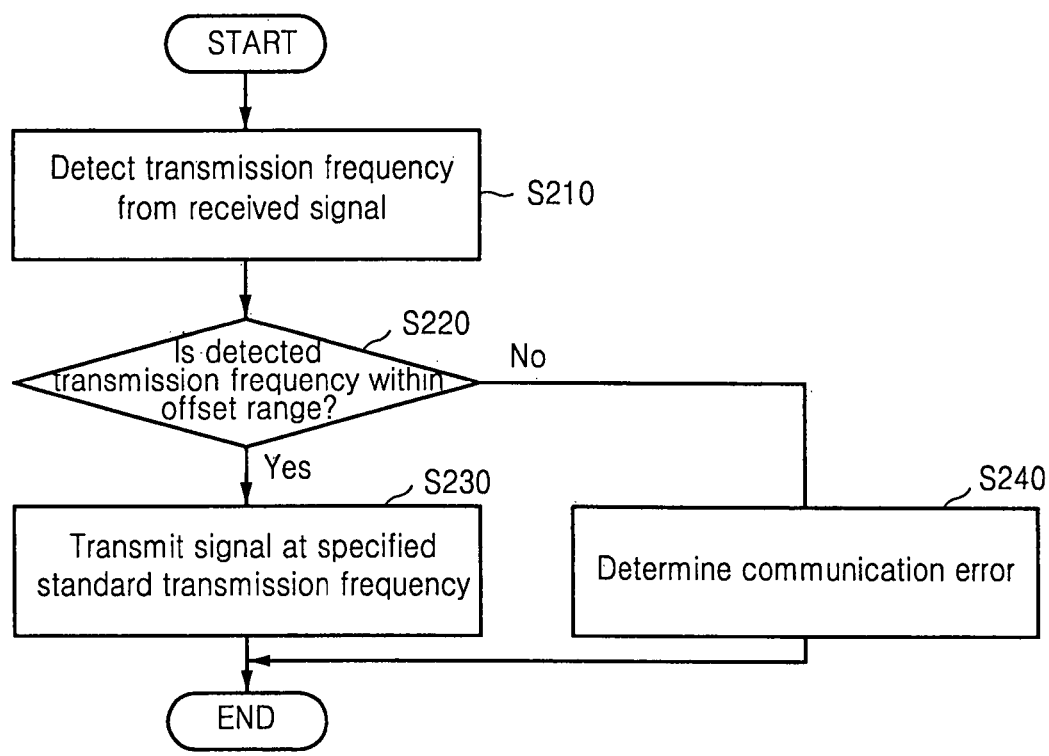
FIG. 2 is a flowchart of a conventional SATA interface method.
Figure 3:
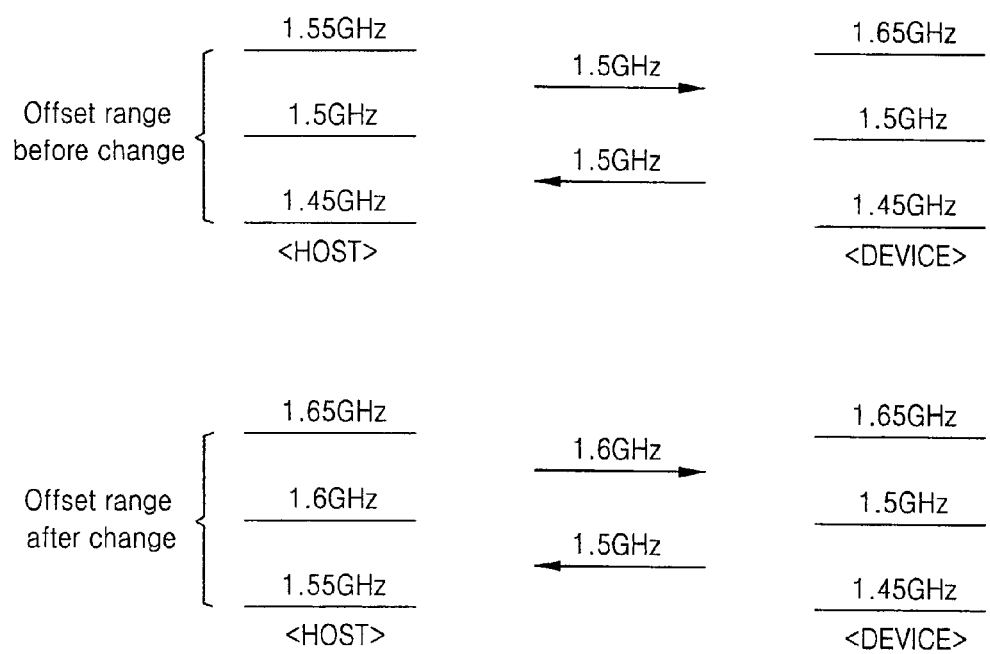
FIG. 3 is a conceptual diagram of the generation of a communication error occurring during data communication using the method illustrated in FIG. 2.

The attached drawings illustrate embodiments of the present invention. These embodiments are presented as teaching examples. However, the invention is not limited to only the illustrated embodiments. Throughout the written description and drawings like reference numerals denote like or similar elements.

Figure 4:
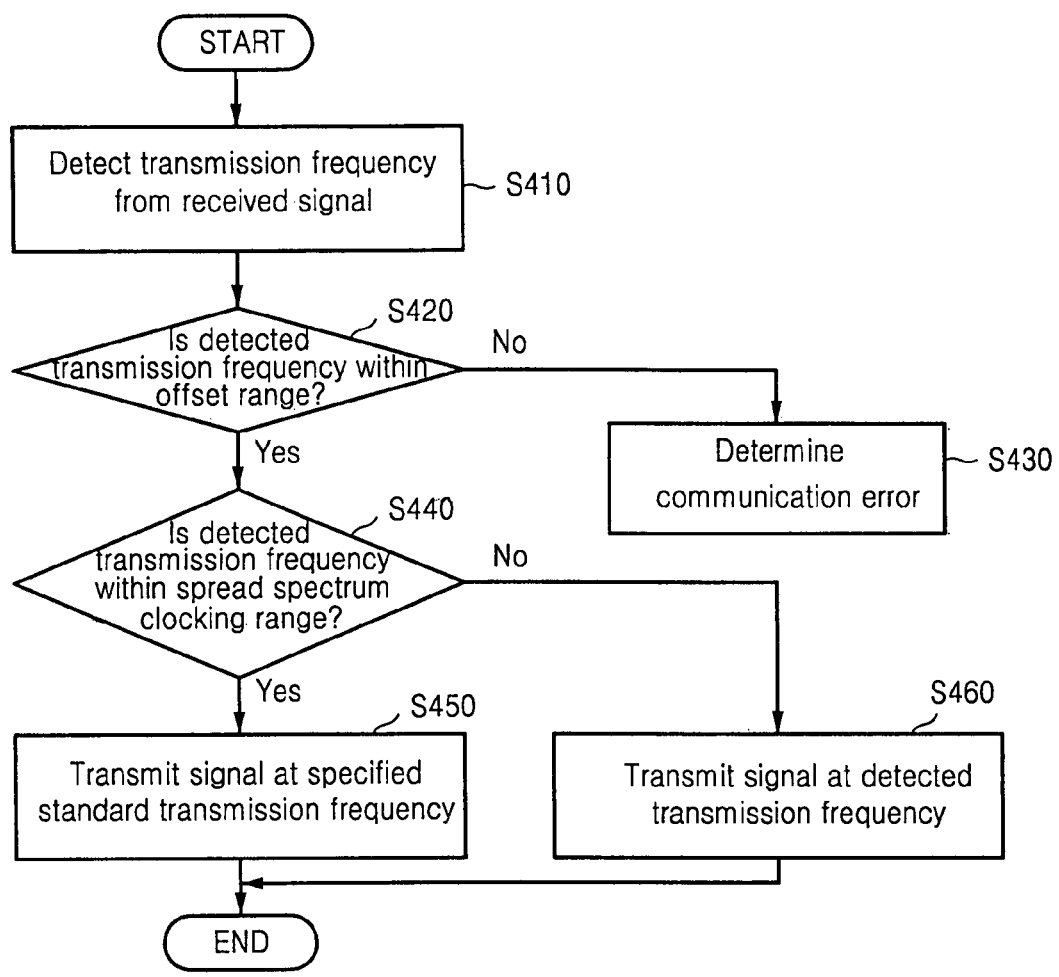
FIG. 4 is a flowchart of a method of controlling a transmission frequency used in SATA according to an embodiment of the present invention.

FIG. 4 is a flowchart illustrating an exemplary method of controlling transmission frequency in a device using serial advanced technology attachment (SATA) technology according to an embodiment of the present invention. In operation S410, a transmission frequency is detected from a signal received from a host or an attached device. In operation S420, it is determined whether the detected transmission frequency is within a receiver offset range. If it is determined that the detected transmission frequency falls outside of the receiver offset range, a communication error is determined in operation S430. Accordingly, a controller within the host or attached device performs one or more transactions associated with a communication error.

If it is determined that the detected transmission frequency falls within the receiver offset range, it is further determined whether the detected transmission frequency is within a defined spread spectrum clocking range in operation S440. If it is determined that the detected transmission frequency falls within the spread spectrum clocking range, data is transmitted to either the attached device or host at a specified standard transmission frequency (e.g., 1.5 GHz for second generation SATA) in operation S450. If it is determined that the detected transmission frequency falls outside of the spread spectrum clocking range, the data is transmitted at the detected transmission frequency in operation S460.

Figure 5:
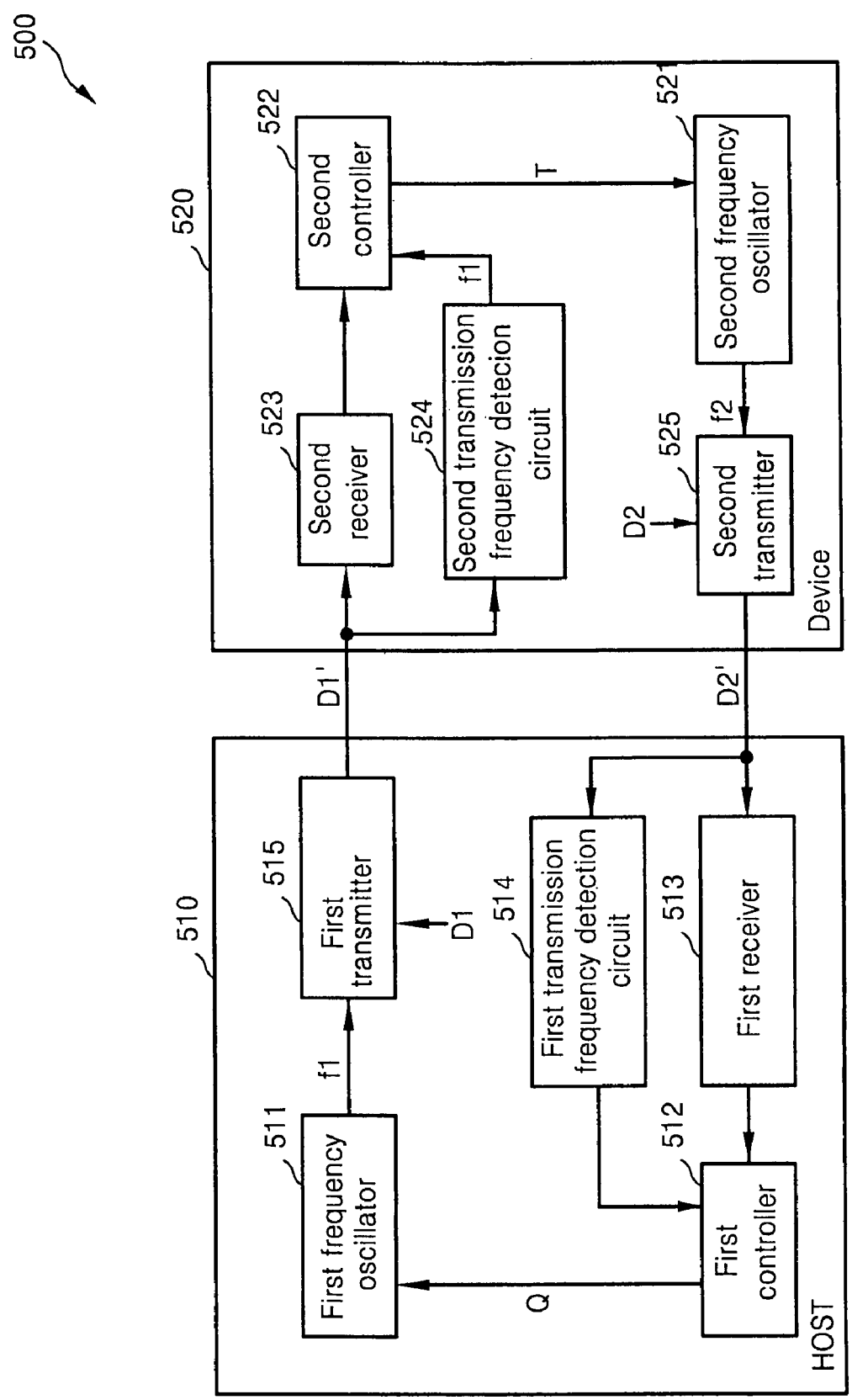
FIG. 5 is a block diagram of an SATA interface system according to an embodiment of the present invention.

FIG. 5 is a block diagram of an SATA interface system 500 according to an embodiment of the present invention. SATA interface system 500 includes a host 510 and an attached device 520. Host 510 includes a first frequency oscillator 511, a first controller 512, a first receiver 513, a first transmission frequency detection circuit 514, and a first transmitter 515. Attached device 520 includes a second frequency oscillator 521, a second controller 522, a second receiver 523, a second transmission frequency detection circuit 524, and a second transmitter 525.

When second receiver 523 of attached device 520 receives a data signal D1' from host 510, second transmission frequency detection circuit 524 detects a transmission frequency f1 from the received data signal D1'. Second controller 522 outputs a control signal "T" based on the detected transmission frequency f1. Second frequency oscillator 521 generates a transmission frequency f2 for transmission of data D2 based on the control signal T. Second transmitter 525 transmits the data D2 to host 510 at the transmission frequency f2.

For example, it is assumed that a specified standard transmission frequency of 1.5 GHz is used for SATA communication between host 510 and attached device 520, an initial receiver offset range for host 510 is 1.45 GHz to 1.55 GHz, and a receiver offset range for attached device 520 is 1.45 GHz to 1.65 GHz. It is also assumed that the receiver offset range for host 510 changes to 1.55 GHz to 1.65 GHz, as the standard transmission frequency of host 510 changes to 1.6 GHz due to a change in ambient operating temperature, or the like.

In a conventional SATA interface system, host 510 would transmit data D1 to attached device 520 at the changed transmission frequency f1 of 1.6 GHz using first transmitter 515. Then, attached device 520 would receive the data signal D1', detect a transmission frequency of f1=1.6 GHz from the received data signal D1', and determine whether the detected transmission frequency f1 is within its receiver offset range of 1.45 GHz to 1.65 GHz. Since the detected transmission frequency f1 (1.6 GHz) would be within the receiver offset range of 1.45 GHz to 1.65 GHz for attached device 520, it would transmit a data signal D2' to host 510 at the standard transmission frequency of f2=1.5 GHz.

However, since the receiver offset range for host 510 has been changed to 1.55 GHz to 1.65 GHz due (e.g.,) to the change in ambient operating temperature, the standard transmission frequency of 1.5 GHz would be detected from data signal D2' received from attached device 520 and would be determined to fall outside of the receiver offset range of 1.55 GHz to 1.65 GHz for host 510. As a result, a communication error would be determined in host 510.

To prevent such a communication error determination from occurring, the SATA interface system 500 of FIG. 5 controls the transmission frequency f2 of attached device 520 in accordance with a determination that the transmission frequency f1 (e.g., 1.6 GHz in the working example) detected by attached device 520 falls within a predetermined standard frequency range (e.g., a spread spectrum clocking (SSC) range).

For example, when transmission frequency f1 falls within the SSC range, (i.e., a range of clock frequencies specified by the SATA Working Group to improve electromagnetic interference (EMI) characteristics), attached device 520 transmits data at the standard transmission frequency f2 (1.5 GHz). When the transmission frequency f1 falls outside the SSC range, attached device 520 transmits data at the detected transmission frequency f1 (1.6 GHz).

Similarly, host 510 adaptively controls the transmission frequency f1 based on a transmission frequency detected from the received data signal D2'. Thus, a detailed description of the operation of host 510 will be omitted to avoid redundancy.

Each of the first and second frequency oscillators 511 and 521 may be implemented as a conventional crystal oscillator. Each of the first and second transmission frequency detection circuits 514 and 524 may be implemented using a conventional clock data recovery (CDR) circuit including a voltage regulator and a phase locked loop (PLL).

Various embodiments of the invention may be implemented, in whole or in part, using computer readable program stored in a non-transitory computer readable recording medium. The computer readable recording medium is any data storage device that can store data which can be thereafter read by a computer system. Also, functional program for accomplishing the present invention can be easily construed by programmers skilled in the art to which the present invention pertains.

As described above, according to the present invention, a transmission frequency is appropriately controlled to minimize a communication error occurring when the transmission frequency is changed due to temperature and jitter between a host and a device.

While the present invention has been particularly shown and described with reference to exemplary embodiments thereof, it will be understood by those of ordinary skill in the art that various changes in form and details may be made therein without departing from the scope of the present invention as defined by the following claims.

What is claimed is:

1. A method of controlling transmission frequency for first and second transmission signals exchanged between a host and an attached device using a serial advanced technology attachment (SATA) technology, the method comprising:
   detecting a first transmission frequency from a received first transmission signal and determining whether the detected first transmission frequency falls within a first predetermined offset range;
   upon determining that the detected first transmission frequency falls within the first predetermined offset range, determining whether the detected first transmission frequency falls within a second predetermined offset range, the second predetermined offset range being a spread spectrum clocking range, and if the detected first transmission frequency falls within the second predetermined offset range, transmitting the second transmission signal at a specified standard transmission frequency; and
   transmitting the second transmission signal at the detected first transmission frequency upon determining that the detected transmission frequency falls outside the second predetermined offset range.

2. The method of claim 1, wherein controlling the second transmission frequency of the second transmission signal further comprises:
   indicating a communication error upon determining that the detected first transmission frequency falls outside of the first predetermined offset range.

3. A non-transitory computer readable medium encoded with a program which performs a method of controlling transmission frequency for first and second transmission signals exchanged between a host and an attached device using a serial advanced technology attachment (SATA) technology, the method comprising:
   detecting a first transmission frequency from a received first transmission signal and determining whether the detected first transmission frequency falls within a first predetermined offset range;
   upon determining that the detected first transmission frequency falls within the first predetermined offset range, determining whether the detected first transmission frequency falls within a second predetermined offset range, the second predetermined offset range being a spread spectrum clocking range;
   upon determining that the detected first transmission frequency falls within the second predetermined offset range, transmitting the second transmission signal at a specified standard transmission frequency; and
   transmitting the second transmission signal at the detected first transmission frequency upon determining that the detected transmission frequency falls outside the second predetermined offset range.

4. The non-transitory computer readable medium of claim 3, wherein controlling the second transmission frequency of the second transmission signal in the method further comprises:
   indicating a communication error upon determining that the detected first transmission frequency falls outside of the first predetermined offset range.

5. A serial advanced technology attachment (SATA) compliant device configured for attachment to a SATA compliant host, the attached device comprising:
   a transmission frequency detection circuit configured to detect a first transmission frequency from a first transmission signal received from the host;
   a SATA compliant controller configured to output a control signal controlling a second transmission frequency of a second transmission signal in accordance with the detected first transmission frequency; and
   a frequency oscillator configured to generate the second transmission frequency of the second transmission signal in response to the control signal
   wherein the SATA compliant controller is further configured to;
   (a) determine whether the detected first transmission frequency falls within a first predetermined offset range, (b) upon determining that the detected first transmission frequency falls within the first predetermined offset range, determining whether the detected first transmission frequency also falls within a second predetermined offset range, the second predetermined offset range being a spread spectrum clocking range, and (c) outputting the control signal to define the second transmission frequency as a specified standard transmission frequency when the detected first transmission frequency falls within the second predetermined offset range, and (d) outputting the control signal to define the second transmission frequency as the detected first transmission frequency when the detected first transmission frequency falls outside the second predetermined offset range.

6. The device claim 5, wherein the device is a hard disc drive.

* * * * *